(12) United States Patent
Jason et al.

(10) Patent No.: US 7,471,681 B2
(45) Date of Patent: Dec. 30, 2008

(54) DETERMINING NETWORK PATH TRANSMISSION UNIT

(75) Inventors: James Jason, Hillsboro, OR (US); Erik J. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 10/269,198

(22) Filed: Oct. 10, 2002

(65) Prior Publication Data

US 2004/0071140 A1    Apr. 15, 2004

(51) Int. Cl.
*H04L 12/26* (2006.01)
(52) U.S. Cl. .................... 370/392; 370/474
(58) Field of Classification Search ............ 370/465, 370/468, 392, 503, 506, 509, 474, 469, 389
See application file for complete search history.

(56) References Cited

U.S. PATENT DOCUMENTS

| | | | | |
|---|---|---|---|---|
| 5,751,970 A * | 5/1998 | Bournas | ..................... | 709/236 |
| 5,892,753 A * | 4/1999 | Badt et al. | ..................... | 370/233 |
| 5,959,974 A * | 9/1999 | Badt et al. | ..................... | 370/233 |
| 6,212,190 B1 * | 4/2001 | Mulligan | ..................... | 370/400 |
| 6,751,234 B1 * | 6/2004 | Ono | ..................... | 370/474 |
| 6,934,768 B1 * | 8/2005 | Block et al. | ..................... | 709/248 |
| 2002/0141448 A1 * | 10/2002 | Matsunaga | ..................... | 370/469 |
| 2002/0186660 A1 * | 12/2002 | Bahadiroglu | ..................... | 370/248 |
| 2003/0076850 A1 * | 4/2003 | Jason, Jr. | ..................... | 370/414 |
| 2003/0185208 A1 * | 10/2003 | Lee et al. | ..................... | 370/389 |
| 2004/0008664 A1 * | 1/2004 | Takahashi et al. | ..................... | 370/351 |

OTHER PUBLICATIONS

Mogul, J., et al., "Path MTU Discovery," Network Working Group, http://www.ietf.org/rfc/rfc1191.txt, Nov. 1990, 19 pgs.

* cited by examiner

*Primary Examiner*—Ricky Ngo
*Assistant Examiner*—Gary Mui
(74) *Attorney, Agent, or Firm*—Blakely, Sokoloff, Taylor & Zafman LLP

(57) ABSTRACT

In one embodiment, a protocol option is implemented in which a network packet stores a maximum transmission unit size to use for sending data on a path between a sender and a recipient. The stored value is replaced if a receiver of the network packet uses a maximum transmission unit (MTU) smaller than the stored value. The option may be used in an initiation packet sent during a communication initiation handshake to allow both establishment of a communication session as well as determination of an efficient transmission unit size. The initiation packet may be sent with a do-not-fragment option set so that if a receiver does not understand the option, and the packet is too large for the receiver, then receiver will reject the packet and place the sender on notice that a conventional trial-and-error approach is required to determine an allowable MTU.

17 Claims, 5 Drawing Sheets

DETERMINING NETWORK PATH TRANSMISSION UNIT

FIELD OF THE INVENTION

The invention generally relates to discovering a network transmission unit size for use in transmitting data between a sender and recipient over a network in which intervening networked machines may have different maximum transmission unit sizes.

BACKGROUND

A network, such as the Internet or other network, may have a variety of networked machines, e.g., routers, gateways, servers, clients, etc. Each networked machine incorporates a network interface card (NIC) (or other communication device) for communicating with other networked machines. Network communication essentially involves transmission of small bundles of data, commonly referred to as "datagrams" or "packets." Unfortunately, there is no standard maximum datagram size, and therefore different machines on a route between communication endpoints (hereafter "path") may utilize different communication mediums (e.g., Ethernet, 802.11) supporting different maximum datagram sizes.

Consequently, communication protocols are designed to break a particular datagram into smaller chunks to accommodate the largest datagram size supported by machines on a path. For example, the Internet Protocol (IP) provides for "IP fragmentation," which refers to the process of breaking IP packets into fragments to satisfy an underlying network interface's Maximum Transmission Unit (MTU). The MTU is the largest physical packet size, e.g., datagram size, supported by a network interface type. As data passes through machines on a network, any received packet larger than a particular machine's MTU is fragmented into smaller packets before being sent on.

Thus, when a sending machine sends a packet to a receiving machine, ideally the MTU used by a sender is no larger than the largest MTU supported by all intervening machines on the path. If the packet is larger than one of the intervening MTUs, as discussed above, it will be fragmented. This fragmentation slows down transmission speed, and because of the best-effort nature of IP, increases the likelihood of the entire datagram being dropped. FIG. 1 illustrates packet fragmentation. A packet is sent 100 based on a sending machine's local MTU. The packet may be received 102 by one or more intervening machines 104 on the path, and the packet's associated length is compared against the intervening recipient's local MTU to determine if 106 the received packet's MTU is larger than the local MTU. If so, the packet is fragmented 108 to accommodate the local MTU. The packet fragments, or the received packet if fragmentation was unnecessary, are forwarded 110 to the recipient. The packet(s) are received 114, and the originally sent packet is reconstructed 116 from the fragments if necessary.

Such fragmentation can have a detrimental effect upon protocols, such as the Transmission Control Protocol (TCP), built on top of IP. A single TCP segment may require encoding as multiple IP packets (the number of packets depends on a sending machine's MTU). If the sending machine MTU is larger than the underlying network's MTU, as discussed above, the packets for the TCP segment are fragmented. A recipient must successfully receive all IP fragments in order to reconstruct the TCP segment. Even if only a single packet fragment is lost, the receiver is unable to reconstruct the datagram and the entire datagram is discarded, the TCP sender eventually times out waiting for an acknowledgment for the discarded TCP segment, resulting in retransmission of the entire TCP segment.

To minimize retransmission risk, some TCP implementations attempt to identify the largest MTU supported along the path. Typically, a trial-and-error approach is taken. As illustrated in FIG. 2, a packet size is selected 200; initially the value is typically the sender's default/desired MTU. A packet is sent 202 with the IP packet "Don't Fragment" (DF) bit set. A router or other intermediary machine between the sender and recipient receives 204 the packet with the DF bit set. A comparison is made between the packet length and the receiver's local MTU. If 206 the local MTU is less than the packet length, the receiver cannot forward on the packet without fragmenting it.

Since the DF bit is set, the receiver drops 208 the packet and sends the sender an Internet Control Message Protocol (ICMP) packet alerting the sender that the datagram was dropped. Sometimes the receiver, along with the ICMP, will report the MTU that should be used. Often, however, only the ICMP is sent, requiring the sender to guess what MTU to use. Thus, for each intermediary between a sender and recipient, processing loops 210 with the sender incrementally selecting 200 another MTU size. The sending host, using the new selected MTU, sends the TCP segment again, which of course may lead to a subsequent intermediary sending another ICMP message. Assuming the current receiver is not the intended recipient, if 206 the sender MTU was not larger than the local MTU, then the packet is forwarded 212 on towards the recipient, where it is received 204 and processed 206-210 as discussed above until the packet is ultimately received by the intended recipient.

This incremental approach to discovering the largest path MTU may result in the sender sending the initial TCP segment numerous times before it finally reaches the intended destination. For short-lived connections, polling can add considerable overhead to the connection because of the retransmissions. This can be especially important for TCP-based applications that wish to be able to process short transactions at a very high rate. For further information, the reader is directed towards Internet Engineering Task Force (IETF) Request for Comments (RFC) 1191.

BRIEF DESCRIPTION OF THE DRAWINGS

The features and advantages of the present invention will become apparent from the following detailed description of the present invention in which.

DETAILED DESCRIPTION

Figure 3:
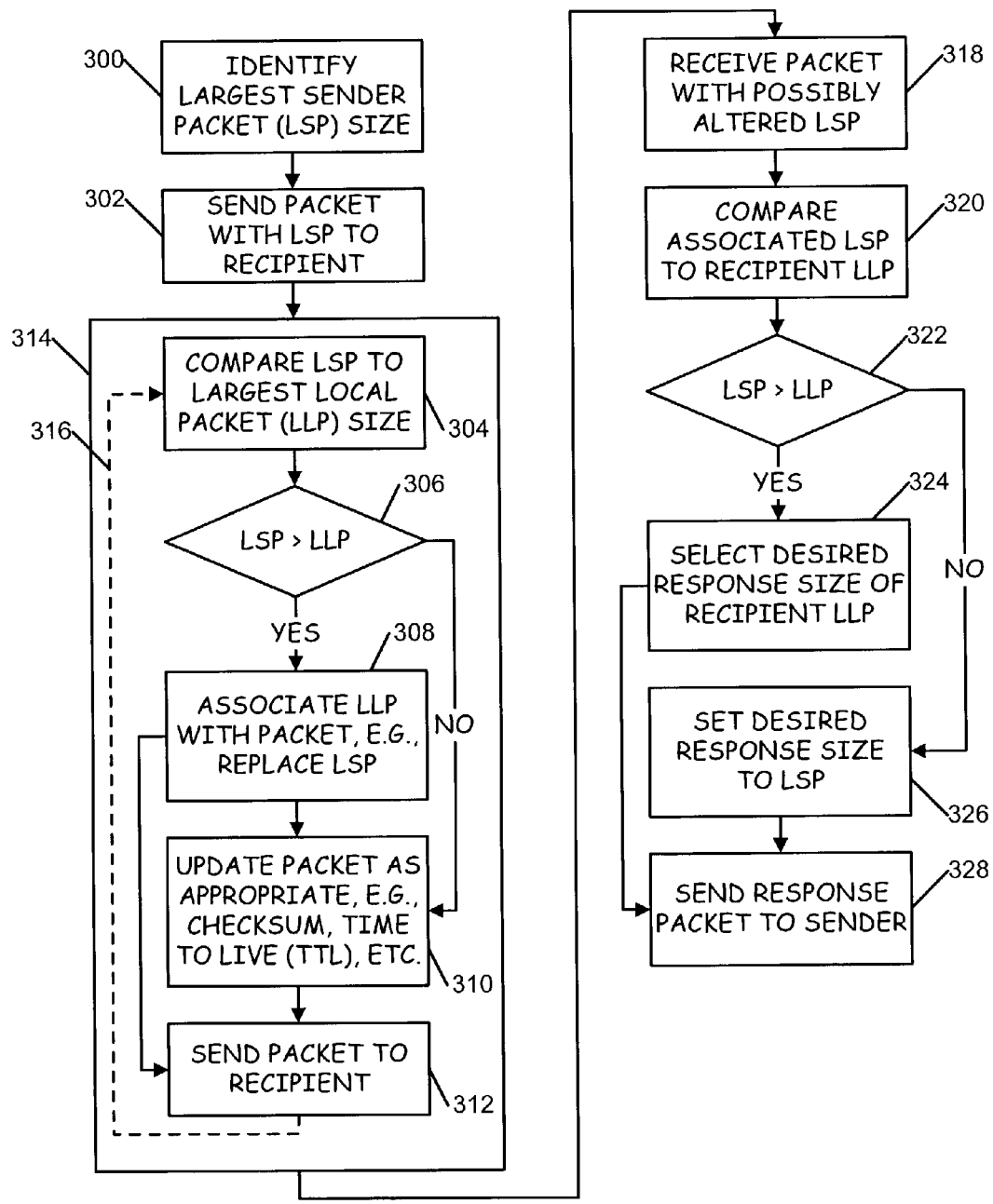
FIG. 3 illustrates according to one embodiment discovering the largest supported MTU for a path between communication endpoints.

FIG. 3 illustrates, according to one embodiment, discovering the largest supported MTU for a path between communication endpoints without relying on the incremental polling method currently used in the prior art. Unless indicated otherwise explicitly or implicitly by context, the terms "sender"

and "recipient" will be used to refer to communication endpoints, and the term "receiver" will refer to an intermediary machine along the network path between the communication endpoints.

The sender identifies 300 the largest sender packet (LSP) size supported by the sender's hardware and/or software. As will be discussed in FIG. 4, in a TCP/IP environment, the LSP may be the sender's MTU; however, it will be appreciated that the FIG. 3 embodiment is not limited to TCP/IP implementations. A packet associated with the sender's LSP is sent 302 to the recipient. In one embodiment, the LSP is stored within the packet in a header portion. In another embodiment, the LSP is stored in the packet as data payload. One or more intervening receivers along the network path receives the packet and compares 304 the packet's associate LSP with the receiver's largest local packet (LLP) size. As with the sender's LSP, in a TCP/IP implementation, the LLP may be the receiver's MTU.

If 306 the LSP is larger than the LLP, then the receiver's LLP is associated 308 with the packet. For example, if the LSP is stored within the packet, then the appropriate portion of the packet is rewritten with the LLP data. If 306 the LSP is not larger than the LLP, or after associating 308 the receiver's LLP with the packet, the packet is updated 310 as appropriate, e.g., the packet's checksum may be recomputed to accommodate associating 308 the receiver's LLP, the Time To Live (TTL) for the packet may be revised, or some other routine update applied to the packet. After updating the packet, it is sent 312 to the recipient. Operations 304-312 are illustrated within box 314 to illustrate that these operations may loop 316 among multiple intervening receivers receipt 318 by the intended recipient.

After receiving 318 the packet, which may now have an associated LSP size smaller than the sender's LSP originally associated with the packet, the currently associated LSP is compared 320 against the recipient's LSP. The recipient is to reply to the sender with a packet identifying the desired LSP to be used by the sender. If 322 the LSP associated with the packet is larger than the recipient's LLP, the recipient's LLP is the smallest LLP size of the machines on the path, and therefore the desired LSP is set 326 to be the recipient's LLP. A response packet is sent 328 to the sender identifying the recipients LLP as the LSP that should be used by the sender to communicate with the recipient. If 322 the LLP is larger than the LSP, the recipient's LLP is either larger than a previously encountered LLP, or larger than the sender's LSP. Therefore, the desired LSP is set 326 to be the currently associated LSP, and the response packet sent 328 accordingly.

Figure 4:
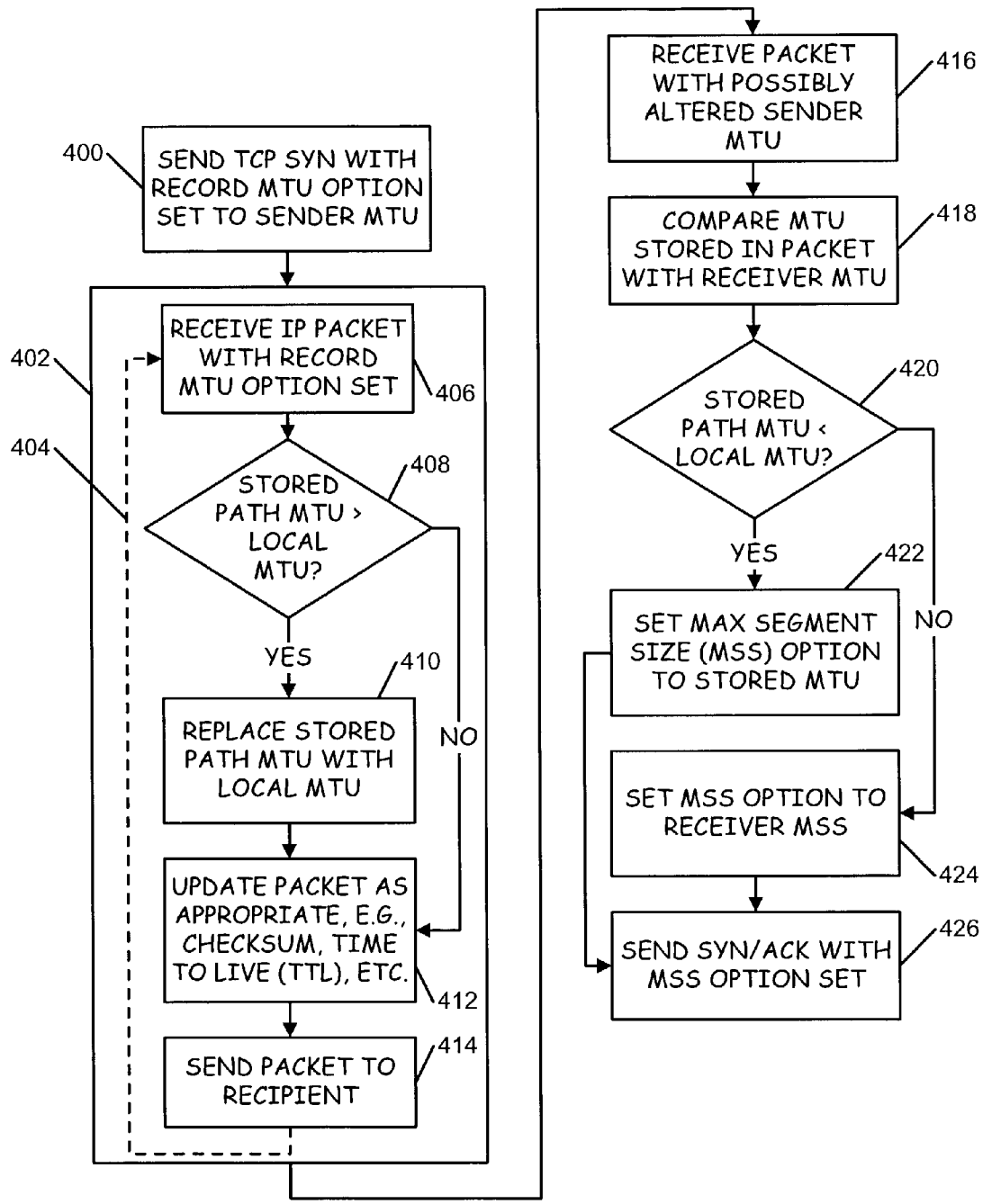
FIG. 4 illustrates an application of the FIG. 3 embodiment to the TCP/IP network communication protocol.

FIG. 4 illustrates an application of the FIG. 3 embodiment to the TCP/IP network communication protocol. In this embodiment, it is assumed communication is in accord with the TCP/IP communication protocol (or equivalent), and a new IP option (Record Maximum Transmission Unit (MTU)), and an existing TCP option (Maximum Segment Size (MSS)) are used to discover the MTU the sender should use without the sender having to engage in the incremental polling method currently used.

As is known in the art, to initiate a TCP/IP connection, the communication endpoints engage in a "three-way handshake" to establish the connection. First, the sender sends a TCP/IP "SYN" packet, e.g., a packet with the SYN flag set, to the recipient endpoint. The recipient responds with a packet with a SYN/ACK packet, e.g., a packet with the SYN and Acknowledgement (ACK) flags set. The sender responds with an ACK packet. As discussed above, it is desirable to optimize the MTU used by the sender. To avoid the trial-and-error MTU discovery discussed above, the illustrated embodiment takes advantage of the SYN packet generally traveling along the same network path over which communication between the endpoints will occur.

When the SYN packet is sent 400 to the recipient, in one embodiment, the packet is sent with a new IP header option, the "Record MTU" option, set to the sender's desired MTU, typically the largest MTU supported by the sender's outgoing network interface. In this embodiment, the Record MTU option is a field added to the IP options field, e.g., a new 6-byte type-length-value (TLV) field. Per current TCP/IP configurations, the type and length are one byte, and the MTU field is four bytes. It will be appreciated that the length field is unnecessary, but in order to conform to the IETF RFC 1812, the length field must be present for routers that do not understand the new option (unknown options are ignored).

As discussed above with respect to FIG. 3, the packet may be received by multiple intermediary receivers, collectively referenced by box 402 and the loop-back 404. When the packet is received 406 by a particular intermediary, for example, a router between the sender and destination recipient, the Record MTU option is processed like the existing IP Record Route option (see, e.g., RFC 791). When a receiver that supports the Record MTU option detects the presence of the option, it compares the receiver's MTU, e.g., the MTU of the receiver's outgoing network interface, to that of the path MTU currently stored in the packet. If 408 the current path MTU is greater than the receiver's, the receiver replaces 410 the MTU field in the Record MTU option with the receiver's MTU. Thus, the smallest MTU supported by the path is kept. Per RFC 1812, receivers that do not understand the Record MTU option will ignore it. If 408 the receiver's MTU exceeds the stored path MTU, or after replacing the stored path MTU, the packet is updated 412, if necessary, e.g., the packet checksum is recomputed, the Time To Live (TTL) decremented, etc.

The packet is then sent on towards the destination recipient; as noted above, processing may loop 404 through multiple intermediary receivers before the SYN packet is received 416 by the recipient. For sending the SYN/ACK to the sender, assuming the recipient understands the Record MTU option, the recipient compares 418 the path MTU with the recipient's MTU. If 420 the path MTU is less than the recipient's MTU, the recipient sets the Maximum Segment Size (MSS) option (see, e.g., RFC 793) for the SYN/ACK packet to the path MTU, e.g., the recipient reports the smallest MTU supported by the machines of the path between the communication endpoints. If 420 the recipient's MTU is less than the path MTU, the recipient sets the MSS option for the SYN/ACK packet to be the recipient's MTU. The SYN/ACK response packet is then sent 426 back to the sender.

In conventional TCP implementations, if the SYN/ACK response does not contain the MSS option, then the sender must assume a default MSS size. However, if the MSS option is set, then the sender must not send a segment larger than the MSS. Thus, as described above, a host can determine an efficient path MTU for segments it will send to the recipient. It will be appreciated that the recipient may utilize the Record MTU option to determine the best MTU for communicating with the sender. Such checking by the recipient may be helpful since routes are not necessarily symmetric. It will also be appreciated that any packet may be sent with the new Record MTU option set. However, unless a long-loved connection is expected, the largest supported path MTU may be efficiently discovered during connection negotiation as discussed above.

Figure 1:
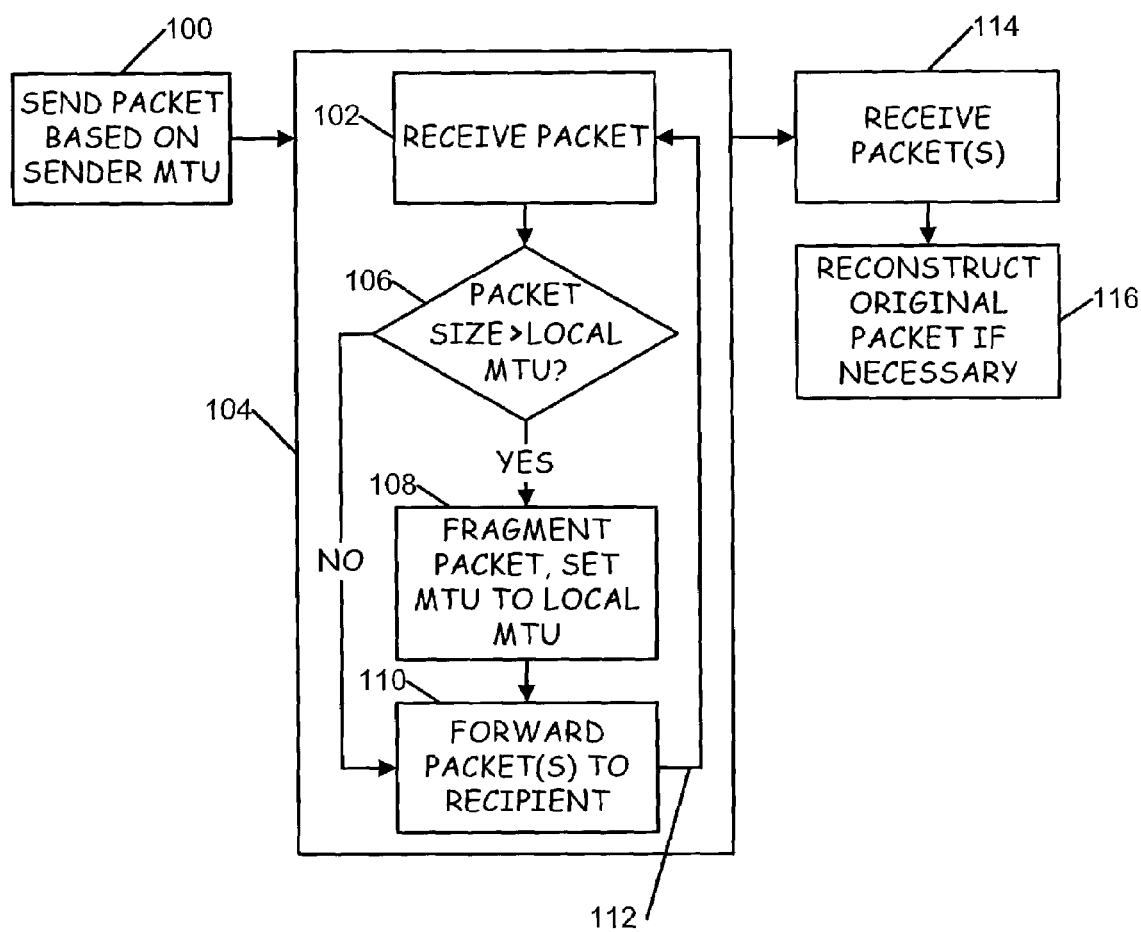
FIG. 1 illustrates packet fragmentation for data sent over a network.
Figure 2:
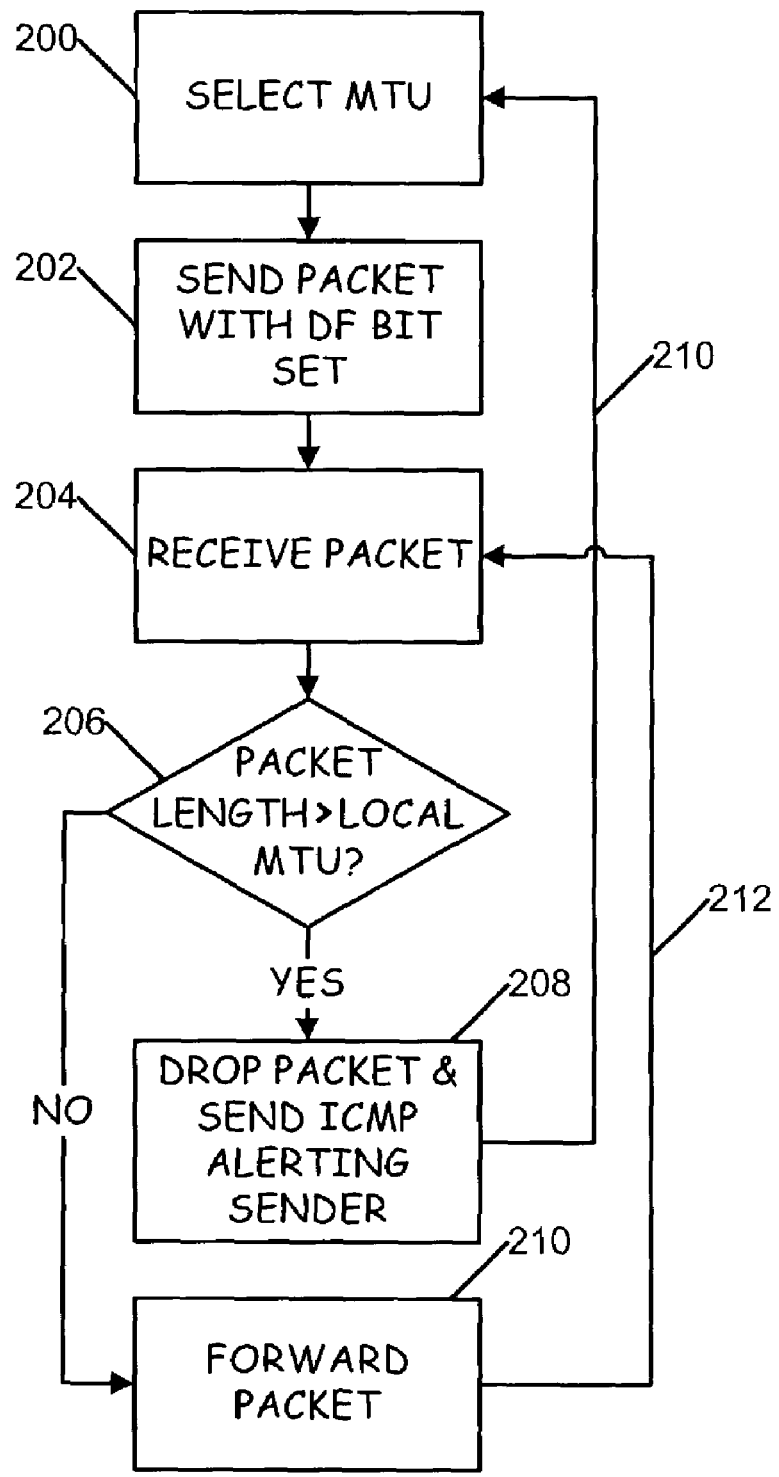
FIG. 2 illustrates a prior art trial-and-error approach for determining the smallest MTU along a network path.

In FIG. 4, the intervening receivers and destination recipient are assumed to understand the new Record MTU option. However, this is not necessarily the case. In one embodiment, not illustrated, the sender sets the Don't Fragment (DF) flag for a sent TCP segment. Thus, if an intervening receiver, or the destination recipient does not understand the new Record MTU option, and the MTU for the segment is too large, then as discussed above with respect to FIG. 2, the segment is dropped and an ICMP error message sent to the sender. This would allow for transparent fallback to traditional polling or other path MTU discovery techniques.

Figure 5:
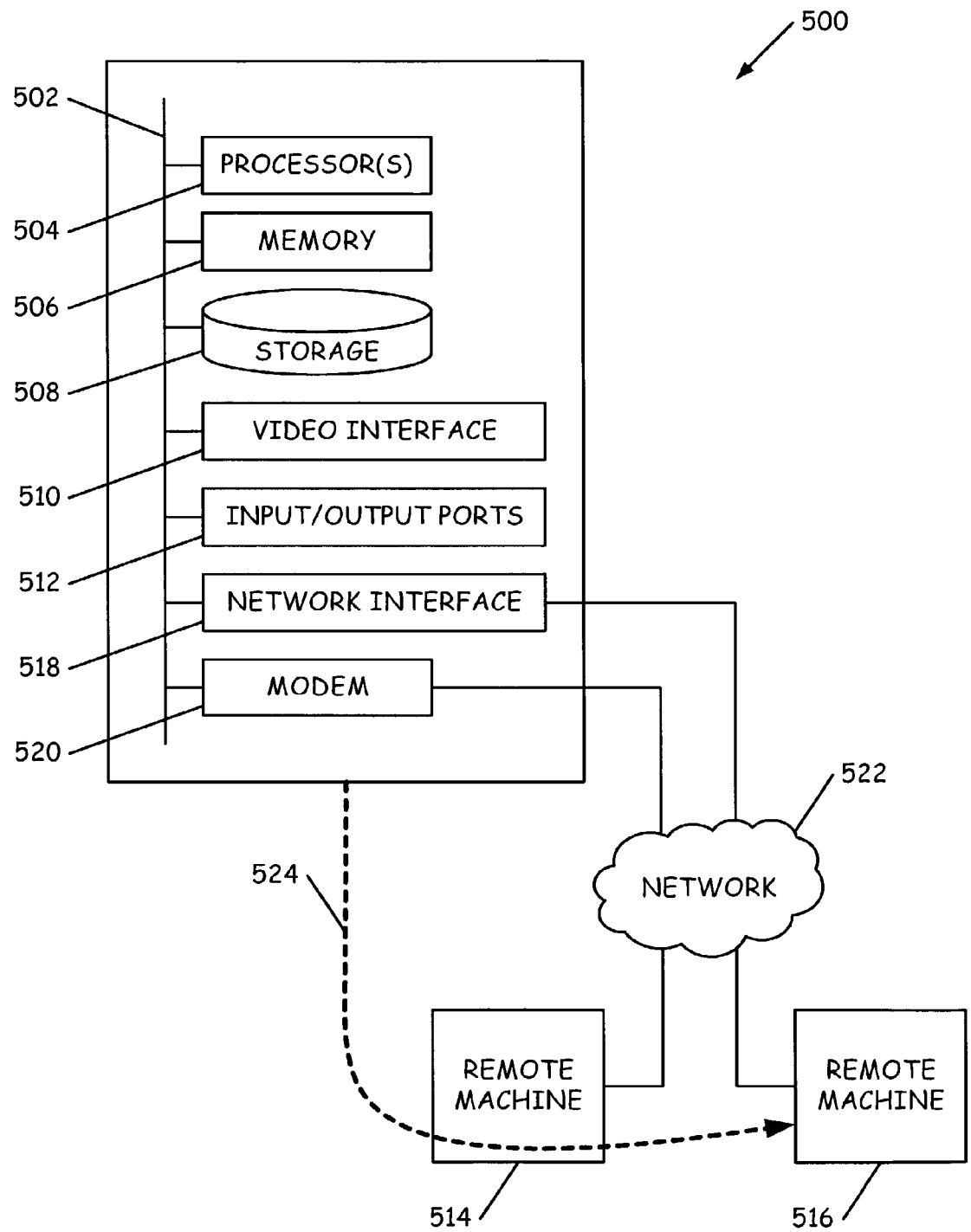
FIG. 5 illustrates a suitable computing environment in which certain aspects of the invention may be implemented.

FIG. 5 and the following discussion are intended to provide a brief, general description of a suitable machine in which certain aspects of the illustrated invention may be implemented. As used herein, the term "machine" includes a single machine, such as a computer, handheld device, transportation device, etc., or a system of communicatively coupled machines or devices.

Typically, a machine 500 includes a system bus 502 to which is attached processors 504, a memory 506, e.g., random access memory (RAM), read-only memory (ROM), or other state preserving medium, storage devices 508, a video interface 510, and input/output interface ports 512. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize connections to one or more remote machines 514, 516, such as through a network interface 518, modem 520, or other communicative coupling. Machines may be interconnected by way of a physical and/or logical network 522, such as an intranet, the Internet, local area networks, and wide area networks. One skilled in the art will appreciated that network 522 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 506, or in storage devices 508 and their associated storage media, including hard-drives, floppy-disks, optical storage, tapes, flash memory, memory sticks, digital video disks, biological storage, etc. Associated data may be delivered over transmission environments, including network 522, in the form of packets, serial data, parallel data, propagated signals, etc., and may be used in a compressed or encrypted format. Associated data may be used in a distributed environment, and stored locally and/or remotely for access by single or multiprocessor machines, portable computers, handheld devices, e.g., Personal Digital Assistants (PDAs), cellular telephones, tablets, etc.

Thus, for example, with respect to the illustrated embodiments, assuming machine 500 embodies a FIG. 4 sender machine establishing a communication session with a destination recipient, then remote machines 514, 516 may respectively be two intermediary receivers on a network path 524 between the communication endpoints. It will be appreciated that remote machines 514, 516 may be configured like machine 500, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for tracking a largest transmission size available along a path between a sender and a recipient, comprising:
   transmitting from the sender a SYN packet addressed to the recipient, the SYN packet storing a first transmission size within a Record Maximum Transmission Unit (RTU) field of an IP options field;
   comparing with an intermediate device between the sender and the recipient, the first transmission size with a second transmission size associated with a network interface of the intermediate device;
   storing in the Record RTU field, the second transmission size within the received SYN packet if the second transmission size is less than the first transmission size;
   transmitting the SYN packet from the intermediate device to the recipient;
   comparing with the recipient, the transmission size stored in the Record RTU field with a third transmission size associated with a network interface of the recipient; and
   transmitting from the recipient to the sender a SYN/ACK response packet with the smallest of the first transmission size, the second transmission size and the third transmission size stored in a MSS Options field.

2. The method of claim 1, wherein the received network packet comprises a packet header in which is stored the first transmission size.

3. The method of claim 2, wherein storing the second transmission size within the network packet comprises:
   replacing the first transmission size stored within the packet header with the second transmission size.

4. The method of claim 1, further comprising:
   forwarding the network packet towards the recipient.

5. The method of claim 1, further comprising:
   maintaining an error checksum for the packet.

6. A method for initiating a TCP/IP communication session between a sender and a recipient configured to recognize a record MTU option in a SYN packet, compare a stored MTU in the SYN packet with the recipient's MTU, and identify a smaller MTU of the stored MTU and the recipient's MTU, the method comprising:

sending the SYN packet to the recipient, the SYN packet including a record MTU option in an IP options field and the SYN packet storing the sender's maximum transmission unit (MTU); and receiving an SYN/ACK packet from the recipient with the maximum segment size (MSS) field storing the MTU value from received in the IP options field of the SYN packet and the responsive packet storing the smaller MTU.

7. The method of claim 6, further comprising:

sending a plurality of network packets, each of said packets having a size no larger than the smaller MTU.

8. A method for tracking a largest-available packet transmission size along a path between a sender and a recipient, comprising:

receiving a network communication initiation packet addressed to the recipient, the network communication initiation packet storing a transmission size within a Record Maximum Transmission Unit (RTU) field of an IP options field;

comparing the stored transmission size with a local transmission size associated with a network interface for transmitting network traffic;

replacing the stored transmission size in the Record Maximum Transmission Unit (RTU) field of the IP options with the local transmission size if the local transmission size is less than the stored transmission size so that a smallest transmission size remains recorded within the network communication initiation packet; and transmitting to the sender an acknowledgement packet with the smallest transmission size indicated in a MSS field.

9. The method of claim 8, wherein the network communication initiation packet has a record MTU option set, said option indicating the presence of the stored transmission size.

10. The method of claim 8, further comprising:

sending an acknowledgement packet to the sender responsive to the network communication initiation packet, the acknowledgement packet having a maximum segment size (MSS) set no larger than the stored transmission size.

11. An article comprising a tangible computer-readable media having stored theron computer-executable instructions for tracking a largest transmission size available along a path between a sender and a recipient, wherein the instructions, when executed, results in a machine performing:

transmitting from the sender a SYN packet addressed to the recipient, the SYN packet storing a first transmission size within a Record Maximum Transmission Unit (RTU) field of an IP options field;

comparing with an intermediate device between the sender and the recipient, the first transmission size with a second transmission size associated with a network interface of the intermediate device;

storing in the Record RTU field, the second transmission size within the received SYN packet if the second transmission size is less than the first transmission size;

transmitting the SYN packet from the intermediate device to the recipient;

comparing with the recipient, the transmission size stored in the Record RTU field with a third transmission size associated with a network interface of the recipient; and transmitting from the recipient to the sender a SYN/ACK response packet with the smallest of the first transmission size, the second transmission size and the third transmission size stored in a MSS Options field.

12. The article of claim 11 wherein the computer-executable instructions for storing the second transmission size within the network packet further includes computer-executable instructions, which when executed, results in the machine performing:

replacing the first transmission size stored within the packet header with the second transmission size.

13. An article comprising a tangible computer-readable media having stored thereon computer-executable instructions for initiating a TCP/IP communication session between a sender and a recipient configured to recognize a record MTU option in a SYN packet, compare a stored MTU in the SYN packet with a recipient's MTU, and identify a smaller MTU of the stored MTU and the recipient's MTU, wherein the instructions, when accessed, results in a machine performing:

sending the SYN packet to the recipient, the SYN packet including a record MTU option in an IP options field and the SYN packet storing the sender's maximum transmission unit (MTU); and receiving an SYN/ACK packet from the recipient with the maximum segment size (MSS) field storing the MTU value from received in the IP options field of the SYN packet and a responsive packet storing the smaller MTU.

14. The article of claim 13 wherein the computer-readable media further includes computer-executable instructions, when executed, results in the machine performing:

sending a plurality of network packets, each of said packets having a size no larger than the smaller MTU.

15. An article comprising a tangible computer-readable media having stored thereon computer-executable instructions for tracking a largest transmission size available along a path between a sender and a recipient, wherein the computer-executable instructions, when executed, results in a machine performing:

receiving a network communication initiation packet addressed to the recipient, the network communication initiation packet storing a transmission size within a Record Maximum Transmission Unit (RTU) field of an IP options field;

comparing the stored transmission size with a local transmission size associated with a network interface for transmitting network traffic;

replacing the stored transmission size in the Record Maximum Transmission Unit (RTU) field of the IP options field with the local transmission size if the local transmission size is less than the stored transmission size so that a smallest transmission size remains recorded within the network communication initiation packet; and transmitting to the sender an acknowledgement packet with the smallest transmission size indicated in a MSS field.

16. The article of claim 15 wherein the computer-readable media further includes computer-executable instructions, when executed, results in the machine performing:

inspecting the network communication initiation packet to determine whether a record MTU option is set.

17. The article of claim 15 wherein the computer-readable media further includes computer-executable instructions, when executed, results in the machine performing:

sending an acknowledgement packet to the sender responsive to the network communication initiation packet, the acknowledgement packet having a maximum segment size (MSS) set no larger than the first transmission size if the first transmission size is stored within the received network packet and to the second transmission size if the second transmission size is stored within the received network packet.

* * * * *